(12) United States Patent
Marche et al.

(10) Patent No.: US 11,258,750 B2
(45) Date of Patent: Feb. 22, 2022

(54) SYSTEMS AND METHODS FOR UNIFIED DATA AND VOICE MESSAGES MANAGEMENT

(71) Applicant: HONEYWELL INTERNATIONAL INC., Morris Plains, NJ (US)

(72) Inventors: Stephane Marche, Toulouse (FR); Martin Mlaskac, Kanice (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 9 days.

(21) Appl. No.: 16/721,034

(22) Filed: Dec. 19, 2019

(65) Prior Publication Data
US 2021/0194846 A1 Jun. 24, 2021

(51) Int. Cl.
*H04L 12/58* (2006.01)
*H04W 4/42* (2018.01)
*H04W 4/12* (2009.01)
*H04L 51/56* (2022.01)
*H04L 29/08* (2006.01)

(52) U.S. Cl.
CPC .............. *H04L 51/36* (2013.01); *H04W 4/12* (2013.01); *H04W 4/42* (2018.02)

(58) Field of Classification Search
CPC ....... H04L 51/36; H04L 51/066; H04L 51/14; H04L 51/10; H04L 67/2823; H04W 4/12; H04W 4/42
See application file for complete search history.

(56) References Cited

U.S. PATENT DOCUMENTS 6,175,314 B1  1/2001  Cobley
7,881,936 B2  2/2011  Longe et al.
(Continued)

FOREIGN PATENT DOCUMENTS

EP  2109270 A1  4/2008

OTHER PUBLICATIONS

Karol Kerns (1991) Data-Link Communication Between Controllers and Pilots: A Review and Synthesis of the Simulation Literature, The International Journal of Aviation Psychology, 1:3, 181-204, DOI: 10.1207/s15327108ijap0103_1.

*Primary Examiner* — Ario Etienne
*Assistant Examiner* — Kamal Hossain
(74) *Attorney, Agent, or Firm* — Lorenz & Kopf, LLP (57) ABSTRACT

A communication system for automatically choosing a communication modality from a plurality of communication modalities for use for communication between distant communication entities is provided. The communication system includes a controller configured to: receive a message in the form of one of a first plurality of modalities from a message originator for transmission to a message recipient and select at least one modality for sending the message to the message recipient. To select the controller is configured to: determine the existence of any predetermined vehicle context requirements, predetermined static requirements, predetermined communication service provider requirements, communication context requirements, message recipient preferences, and message originator preferences; and make the selection based on those requirements and preferences. The controller is further configured to convert the received message to the selected modality and cause the message to be transmitted to the message recipient.

20 Claims, 4 Drawing Sheets

(56) References Cited

U.S. PATENT DOCUMENTS

| | | |
|---|---|---|
| 8,068,588 B2 | 11/2011 | Ramanathan et al. |
| 9,094,363 B1 * | 7/2015 | Lin .................. H04L 69/24 |
| 9,123,341 B2 | 9/2015 | Weng et al. |
| 9,330,089 B2 | 5/2016 | Gandrabur et al. |
| 9,484,034 B2 | 11/2016 | Watanabe et al. |
| 9,558,745 B2 * | 1/2017 | Schalk ................ G10L 15/22 |
| 9,697,822 B1 * | 7/2017 | Naik .................. G10L 15/22 |
| 9,786,273 B2 | 10/2017 | Longe et al. |
| 9,922,651 B1 | 3/2018 | Nelson et al. |
| 10,165,105 B1 | 12/2018 | Do et al. |
| 10,209,853 B2 | 2/2019 | Weng et al. |
| 10,229,682 B2 | 3/2019 | Grant et al. |
| 2007/0189328 A1 | 8/2007 | Judd |
| 2010/0027768 A1 * | 2/2010 | Foskett ............. H04B 7/18506 <br> 379/88.14 |
| 2012/0035923 A1 | 2/2012 | Krause |
| 2012/0196614 A1 | 8/2012 | Arora et al. |
| 2013/0023287 A1 * | 1/2013 | Shaw .................... G10L 15/26 <br> 455/456.1 |
| 2013/0079029 A1 * | 3/2013 | Levien ................ H04W 76/10 <br> 455/456.1 |
| 2014/0258419 A1 * | 9/2014 | Osterloh ............. H04L 51/14 <br> 709/206 |
| 2015/0301796 A1 | 10/2015 | Visser et al. |
| 2016/0044474 A1 * | 2/2016 | Cheung ............... H04M 3/436 <br> 455/414.1 |
| 2016/0063999 A1 | 3/2016 | Gaston et al. |
| 2016/0191430 A1 * | 6/2016 | Malatack ........... H04L 51/063 <br> 370/329 |
| 2016/0360426 A1 * | 12/2016 | Shaw .................. H04L 67/12 |
| 2016/0381533 A1 * | 12/2016 | Fogelson ........... H04L 51/066 <br> 455/414.1 |
| 2017/0106997 A1 * | 4/2017 | Bekanich ......... H04B 7/18506 |
| 2017/0365177 A1 | 12/2017 | Puentes et al. |

* cited by examiner

SYSTEMS AND METHODS FOR UNIFIED DATA AND VOICE MESSAGES MANAGEMENT

TECHNICAL FIELD

Embodiments of the subject matter described herein relate generally to communication systems. More particularly, embodiments of the subject matter relate to systems and methods for automatically choosing communication modalities.

BACKGROUND

Driving a vehicle, whether a road-based vehicle such as a truck or an aerial vehicle such as an aircraft, requires the attention of the vehicle driver (or vehicle operator). A vehicle driver who has too many tasks to undertake while driving a vehicle (e.g., high driver workload), particularly at critical times, can become distracted and a vehicle mishap may occur as a result. Communication between a vehicle driver and other entities may be necessary at times but can also be distracting at times. Multiple communication modalities, such as voice or text, may be available for the vehicle driver. Use of one modality may be more effective for communication but at the same time may increase driver workload and be more distracting for the vehicle driver. For example, a text message may be a more effective modality for communicating at a given time for a truck driver but may also be a more distracting form of communication for the truck driver.

In the case of air travel, there is a desire to decrease flight crew workload to reduce the number of potential flight related mishaps. Additionally, many tasks presently performed by multiple flight crew members, if simplified, could help enable single pilot operation. Communication between flight crew and other entities, if simplified, could help with a move toward single pilot operation. Communication between flight crew and other entities may involve multiple communication modalities. When communicating with different entities, the flight crew often needs to identify one modality out of multiple modality mechanisms available to use for communication, often at critical times. Having to determine the communication modality to use can increase flight crew workload.

Hence, it is desirable to provide systems and methods for automatically choosing communication modalities. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A communication system for automatically choosing a communication modality from a plurality of communication modalities for use for communication between distant communication entities is provided. The communication system includes a controller configured to: receive a message in the form of one of a first plurality of modalities from a message originator for transmission to a message recipient. The controller is further configured to: select at least one modality from a second plurality of modalities for sending the message to the message recipient, wherein the second plurality of modalities includes a digital data transmission, a digital voice transmission, a digital text message and an analog voice message, and wherein to select the controller is further configured to: determine for the specific message recipient the existence of any predetermined vehicle context requirements, predetermined static requirements, predetermined communication service provider requirements, communication context requirements, message recipient preferences, and message originator preferences; and make the selection based on the existing predetermined vehicle context requirements, predetermined static requirements, predetermined communication service provider requirements, communication context requirements, message recipient preferences, and message originator preferences. The controller is further configured to convert the received message to the selected modality when the selected modality is different from the modality of the received message and cause the message to be transmitted in the form of the selected modality to the message recipient.

A processor-implemented method for automatically choosing a communication modality from a plurality of communication modalities for use for communication between distant communication entities is provided. The method includes: receiving a message in the form of one of a first plurality of modalities from a message originator for transmission to a message recipient. The method further includes selecting at least one modality from a second plurality of modalities for sending the message to the message recipient, wherein the second plurality of modalities includes a digital data transmission, a digital voice transmission, a digital text message and an analog voice message, and wherein the selecting includes: determining for the specific message recipient the existence of any predetermined vehicle context requirements, predetermined static requirements, predetermined communication service provider requirements, communication context requirements, message recipient preferences, and message originator preferences; and making the selection based on the existing predetermined vehicle context requirements, predetermined static requirements, predetermined communication service provider requirements, communication context requirements, message recipient preferences, and message originator preferences. The method further includes converting the received message to the selected modality when the selected modality is different from the modality of the received message; and transmitting the message in the form of the selected modality to the message recipient.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for reducing the workload for communication between a vehicle operator (e.g., a pilot, truck driver, etc.) and a central system (e.g., air traffic controller, truck logistic center, etc.). The apparatus, systems, techniques and articles disclosed herein can provide a fully integrated voice and data communication management system. The apparatus, systems, techniques and articles provided herein can contribute to reducing workload during communications between a vehicle operator and a central system. The apparatus, systems, techniques and articles provided herein can contribute to reducing workload during communications by: automatically selecting the best communication modality for communications between communication participants (e.g., vehicle operator and central system); reducing the analyzing time of messages by communication participants through a unified representation of incoming voice and data messages in a consistent way; and enabling a more systematic automation of actions driven by messages (whether they are received by data or voice)

The apparatus, systems, techniques and articles provided herein can contribute to increasing safety by avoiding confusion in communication. The apparatus, systems, techniques and articles provided herein can contribute to decreasing operation costs: by allowing the vehicle owner (and vehicle operating center such as an airline operating center) to optimize communication costs by selecting the most cost efficient mode of communication at a given time. The apparatus, systems, techniques and articles provided herein can contribute to decreasing vehicle costs by allowing use of fully digital solutions for both data and voice.

Figure 1:
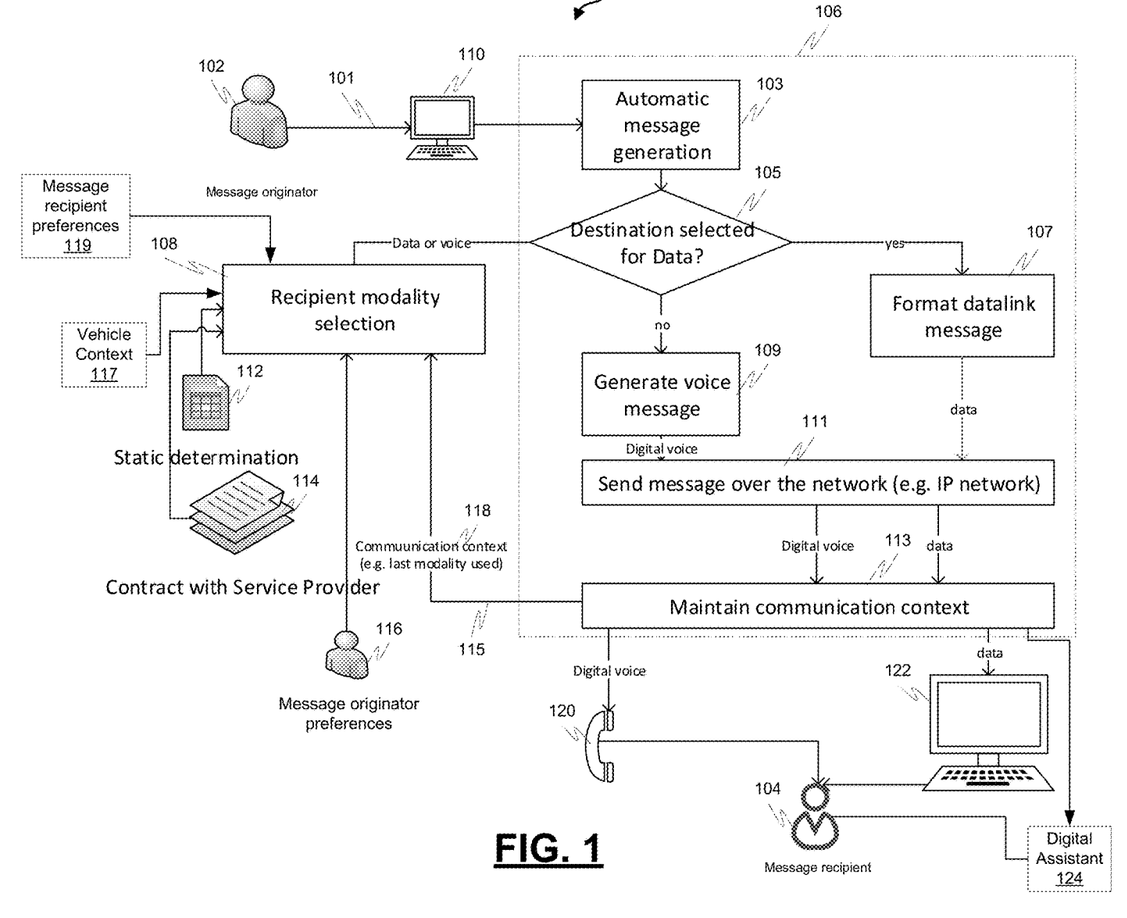
FIG. 1 is a data flow diagram depicting an example process in a unified communication system for use by a message originator for sending messages to one or more message recipients, in accordance with some embodiments.

FIG. 1 is a data flow diagram depicting an example process in a unified communication system 100 for use by a message originator 102 for sending messages to one or more message recipients 104. The message originator 102 may be a vehicle operator such as a pilot (or other flight crew member), a truck driver, or some other type of vehicle operator who may need to communicate with a plurality of different control centers (e.g., ATC) during a mission. Different modalities may be used to communicate with the different control centers. The unified communication system 100 is configured to automatically select a communication modality for use when communicating with a particular control center freeing the vehicle operator to focus his/her attention on matters other than choosing the correct modality for the particular control center.

Alternatively, the message originator may be a control center that needs to communicate with a plurality of different vehicles that use different communication modalities. The unified communication system 100 can allow the message originator, when it is a control center, to send messages to each of a plurality of vehicle operators using the right modality for each vehicle operator. The unified communication system 100 is configured to automatically select a correct modality for a message transmission.

The example unified system 100 includes an automatic message generation module 106 and a recipient modality selection module 108. The example process includes a message originator 102 entering a data message via an electronic device 110, such as a terminal, tablet computer, EFB, smartphone, or other electronic device (operation 101). The automatic message generation module 106, in turn, automatically generates a data message for transmission using the proper modality for transmission.

The recipient modality selection module 108 is configured to determine the proper modality for transmission. To do so, the recipient modality selection module 108 is configured to determine for each specific message recipient the existence of any predetermined vehicle context requirements 117, predetermined static requirements 112, predetermined communication service provider requirements 114, communication context requirements 116, message recipient preferences 119, and message originator preferences 118. The recipient modality selection module 108 is configured to make a modality selection based on the existing predetermined vehicle context requirements 117, predetermined static requirements 112, predetermined communication service provider requirements 114, communication context requirements 116, message recipient preferences 119, and message originator preferences 118. Examples of a predetermined vehicle context requirement 117 includes the existence of a non-normal vehicle state such as fire on-board the vehicle or the vehicle being driven in a very reactive environment such as final approach or landing for an aircraft, and lots of turns for an automobile. The predetermined vehicle context requirement in these examples may necessitate the use of voice instead of data for a communication modality. An example of a predetermined static requirement 112 may be a requirement wherein the message recipient can only receive a message in less than all of the available modalities, such as the ability to only receive a digital data or analog voice message. An example of a predetermined communication service provider requirement 114 may be a requirement wherein the communication service provider only allows communication with a specific recipient using a particular modality such as digital data. An example of user preferences 116 may be a preference wherein the user may want to transmit certain types of messages only using one specific modality and transmit other types of messages using a different modality. An example of communication context requirements 118 may be a requirement wherein when the latest communication between the message originator and message recipient is via a first modality type, subsequent communication between the message originator and the message recipient should also be via that same first modality type.

After the message originator's entry of a data message, the process includes the automatic generation of a data message (operation 103) and a determination of the destination for the data (decision 105). The recipient modality selection module 108 will determine whether the modality should be data or voice and provide that information to the automatic message generation module 106. At decision 105, when it has been determined that the recipient modality should be data, the message is formatted by the automatic message generation module 106 as a data link message (operation 107). When it has been determined that the recipient modality should be voice, the message is formatted by the automatic message generation module 106 as a digital voice message (operation 109).

In this example, regardless of whether the message is formatted as digital voice or formatted as a data link message, the message is sent over a network such as an IP network to the message recipient (operation 111). If the message is received by the message recipient 104 as digital voice, the message recipient 104 will receive the message, for example, via a digital telephone or digital phone software running on an electronic device 120. If the message is received by the message recipient 104 as digital data, the message recipient 104 will receive the message via an electronic device 122. The automatic message generation module 106 is also configured to maintain communication context (operation 113). The automatic message generation module 106 can maintain communication context by communicating the last modality used to the recipient modality selection module 108 (operation 115).

The example unified system 100 also includes a digital assistant 124 that is configured to automatically communicate in case the message recipient 104 is busy. When the digital assistant 124 has been activated by the message recipient 104, the digital assistant 124 can appropriately respond to non-critical messages.

For example, a pilot (e.g., message recipient 104) could activate automatic VHF frequency transfer. If a message commanding VHF frequency transfer is received from the ground (e.g., message originator 102) via voice or via data, and if the pilot has activated the automatic communication assistant (e.g., digital assistant 124), the digital assistant 124 will automatically perform the action of automatic VHF frequency transfer.

While communication between two entities is depicted, the example unified system 100 should not be limited to two entities. For example, one truck driver could communicate with several centers and several other truck drivers, but there will be communication context management for each pair of communicating entities, possibly using common factors (e.g. user preferences are the same for all Control Centers).

Figure 2:
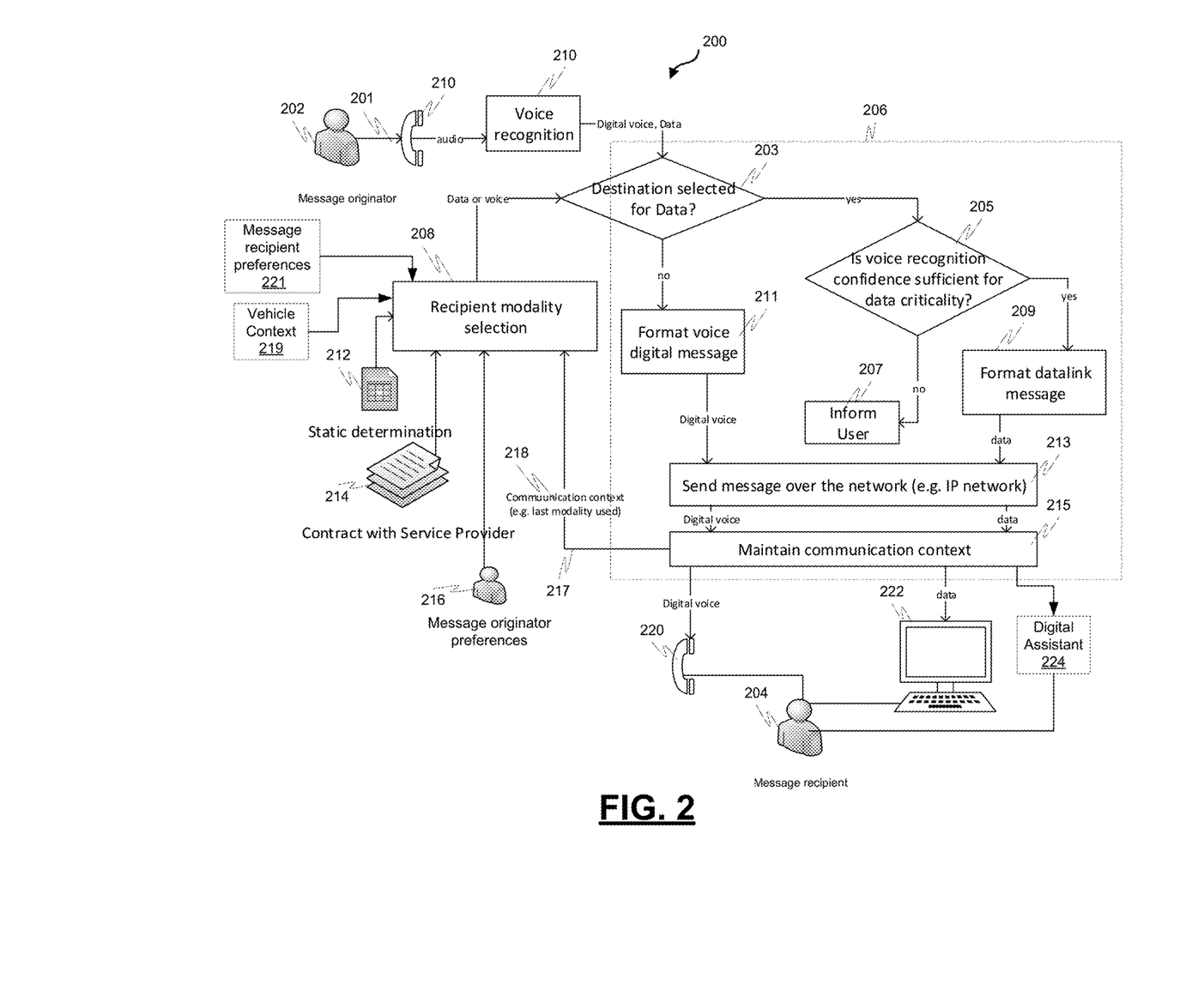
FIG. 2 is a data flow diagram depicting another example process in a unified communication system for use by a message originator for sending messages to one or more message recipients, in accordance with some embodiments.

FIG. 2 is a data flow diagram depicting another example process in a unified communication system 200 for use by a message originator 202 for sending messages to one or more message recipients 204. The message originator 202 may be a vehicle operator such as a pilot (or other flight crew member), a truck driver, or some other type of vehicle operator who may need to communicate with a plurality of different control centers (e.g., ATC) during a mission. Different modalities may be used to communicate with the different control centers. The unified communication system 200 is configured to automatically select a communication modality for use when communicating with a particular control center freeing the vehicle operator to focus his/her attention on matters other than choosing the correct modality for the particular control center.

Alternatively, the message originator 202 may be a control center that needs to communicate with a plurality of different vehicles that use different communication modalities. The unified communication system 200 can allow the message originator 202, when it is a control center, to send messages to each of a plurality of vehicle operators using the right modality for each vehicle operator. The unified communication system 200 is configured to automatically select a correct modality for a message transmission.

The example unified system 200 includes an automatic message generation module 206 and a recipient modality selection module 208. The example process includes a message originator 202 sending an analog voice message via an analog voice device 210, such as a telephone (operation 201). A voice recognition module 230 comprising voice recognition software, for example, may perform voice recognition operations to convert the analog voice received from the analog voice device 210 into digital voice and/or digital data. The automatic message generation module 206, in turn, automatically generates a data message for transmission using the proper modality for transmission.

The recipient modality selection module 208 is configured to determine the proper modality for transmission. To do so, the recipient modality selection module 208 is configured to determine for each specific message recipient the existence of any predetermined vehicle context requirements 219, predetermined static requirements 212, predetermined communication service provider requirements 214, communication context requirements 216, message recipient preferences 221, and message originator preferences 218. The recipient modality selection module 208 is configured to make a modality selection based on the existing predetermined vehicle context requirements 219, predetermined static requirements 212, predetermined communication service provider requirements 214, communication context requirements 216, message recipient preferences 221, and message originator preferences 218. Examples of a predetermined vehicle context requirement 219 includes the existence of a non-normal vehicle state such as fire on-board the vehicle or the vehicle being driven in a very reactive environment such as final approach or landing for an aircraft, and lots of turns for an automobile. The predetermined vehicle context requirement in these examples may necessitate the use of voice instead of data for a communication modality. An example of a predetermined static requirement 212 may be a requirement wherein the message recipient can only receive less than all of the available modalities, such as can only receive a digital data or analog voice message. An example of a predetermined communication service provider requirement 214 may be a requirement wherein the communication service provider only allows communication with a specific recipient using a particular modality such as digital data. An example of user preferences 216 may be a preference wherein the user may want to transmit certain types of messages only using one specific modality and transmitting other types of messages using a different modality. An example of communication context requirements 218 may be a requirement wherein when the latest communication between the message originator and message recipient is via a first modality type, subsequent communication between the message originator and the message recipient should also be via that same first modality type.

After the message originator's entry of a voice message and the conversion of the voice message to digital voice and/or data, the process includes a determination of whether the modality for the message is digital data (decision 203). The recipient modality selection module 208 will determine whether the modality should be data or voice and provide that information to the automatic message generation module 206. At decision 203, when it has been determined that the recipient modality should be data (yes at decision 203), a decision is made regarding whether voice recognition confidence is sufficient for the data criticality (decision 205). If the voice recognition confidence is not sufficient for the data criticality (no at decision 205), the process includes informing the user (operation 207). If the voice recognition confidence is indeed sufficient for the data criticality (yes at decision 205), the process includes formatting by the automatic generation message module 206 the message as a data link message (operation 209). When it has been determined that the recipient modality should be voice (no at decision 203), the message is formatted by the automatic message generation module 206 as a digital voice message (operation 211).

In this example, regardless of whether the message is formatted as digital voice or formatted as a data link message, the message is sent over a network such as an IP network to the message recipient (operation 213). If the message is received by the message recipient 204 as digital voice, the message recipient 204 will receive the message, for example, via a digital telephone or digital phone software running on an electronic device 220. If the message is received by the message recipient 204 as digital data, the message recipient 204 will receive the message via an electronic device 222. The automatic message generation module 206 is also configured to maintain communication context (operation 215). The automatic message generation module 206 can maintain communication context by communicating the last modality used to the recipient modality selection module 208 (operation 217).

Similar systems are envisioned for a unified communication system when other modalities are used for message generation by the message originator and/or other modalities are used for the message that is transmitted to the message recipient. As illustrated in the following examples: (a) when the received communication is an analog voice communication and the selected modality is digital data transmission, the unified communication system can be configured to cause the analog voice communication to be converted to a digital data transmission using voice recognition software, determine whether voice recognition confidence is sufficient for the criticality of conveyed information, cause the digital data transmission to be transmitted to the message recipient when the voice recognition confidence is sufficient for the criticality of conveyed information, and notify the message originator when the voice recognition confidence is not sufficient; (b) when the received communication is an analog voice communication and the selected modality is digital voice transmission, the unified communication system can be configured to cause the analog voice communication to be converted to a digital voice transmission using voice recognition software, determine whether voice recognition confidence is sufficient for the criticality of conveyed information, cause the digital voice transmission to be transmitted to the message recipient when the voice recognition confidence is sufficient for the criticality of conveyed information, and notify the message originator when the voice recognition confidence is not sufficient; (c) when the received communication is digital text and the selected modality is digital data transmission, the unified communication system can be configured to cause the digital text to be converted to a digital data transmission and cause the digital data transmission to be transmitted to the message recipient; (d) when the received communication is digital text and the selected modality is digital voice transmission, the unified communication system can be configured to cause the digital text to be converted to a digital voice transmission and cause the digital voice transmission to be transmitted to the message recipient; (e) when the received communication is a digital data transmission and the selected modality is digital text, the unified communication system can be configured to cause the digital data transmission to be converted to digital text and cause the digital text to be transmitted to the message recipient; (f) when the received communication is a digital data transmission and the selected modality is an analog voice communication, the unified communication system can be configured to cause the digital data transmission to be converted to an analog voice communication and cause the analog voice communication to be transmitted to the message recipient; (g) when the received communication is a digital voice transmission and the selected modality is digital text, the unified communication system can be configured to cause the digital voice transmission to be converted to digital text and cause the digital text to be transmitted to the message recipient; and/or (h) when the received communication is a digital voice transmission and the selected modality is an analog voice communication, the unified communication system can be configured to cause the digital voice transmission to be converted to an analog voice communication and cause the analog voice communication to be transmitted to the message recipient.

The example unified system 200 also includes a digital assistant 224 that is configured to automatically communicate in case the message recipient 204 is busy. When the digital assistant 224 has been activated by the message recipient 204, the digital assistant 224 can appropriately respond to non-critical messages.

For example, a pilot (e.g., message recipient 204) could activate automatic VHF frequency transfer. If a message commanding VHF frequency transfer is received from the ground (e.g., message originator 202) via voice or via data, and if the pilot has activated the automatic communication assistant (e.g., digital assistant 224), the digital assistant 224 will automatically perform the action of automatic VHF frequency transfer.

While communication between two entities is depicted, the example unified system 200 should not be limited to two entities. For example, one truck driver could communicate with several centers and several other truck drivers, but there will be communication context management for each pair of communicating entities, possibly using common factors (e.g. user preferences are the same for all Control Centers).

Figure 3:
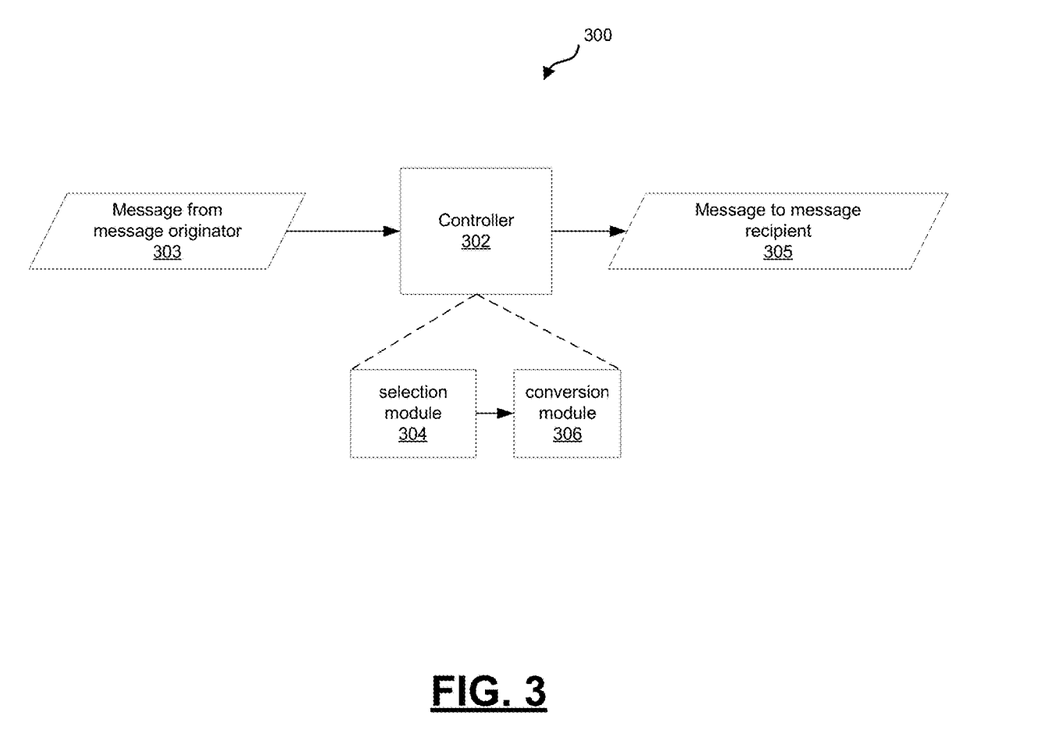
FIG. 3 is a block diagram depicting an example unified communication system 300 for automatically choosing a communication modality from a plurality of communication modalities for use for communication between distant communication entities, in accordance with some embodiments.

FIG. 3 is a block diagram depicting an example unified communication system 300 for automatically choosing a communication modality from a plurality of communication modalities for use for communication between distant communication entities. The unified communication system 300 comprises a controller 302. The example controller 302 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example controller 302 is configured to: receive a message 303 in the form of one of a first plurality of modalities from a message originator for transmission to a message recipient. The message originator may be one of a vehicle operator or a central control system and the message recipient may be the other of the vehicle operator or the central control system. Alternatively, both the message originator and the message operator may be a vehicle operator. The example controller 302 is configured to receive the communication from the message originator in the form of analog voice, digital text, digital voice transmission, a digital data transmission, and/or other forms.

The example controller 302 is configured to select at least one modality from a second plurality of modalities for sending the message to the message recipient, wherein the second plurality of modalities may include a digital data transmission, a digital voice transmission, a digital text message, an analog voice message, and/or others. To select, the example controller 302 may include a selection module 304 that is configured to: determine for the specific message recipient the existence of any predetermined vehicle context requirements, predetermined static requirements, predetermined communication service provider requirements, communication context requirements, message recipient preferences, message originator preferences and/or other criteria; and make the message context selection based on the existing predetermined vehicle context requirements, predetermined static requirements, predetermined communication service provider requirements, communication context requirements, message recipient preferences, message originator preferences and/or other criteria. The example controller 302 may include a conversion module 306 that is configured to convert the received message to the selected modality when the selected modality is different from the modality of the received message. The example controller 302 is further configured to cause the message 305 to be transmitted in the form of the selected modality to the message recipient.

To make the selection, the example controller 302 may be configured (e.g., via the selection module 304) to make a selection that satisfies the predetermined vehicle context requirements, the predetermined static requirements and/or the predetermined communication service provider requirements. To make the selection, the example controller 102 may be configured to make the selection that satisfies communication context requirements, message recipient preference, and/or a message originator preference when the predetermined vehicle context requirements, the predetermined static requirements and predetermined communication service provider requirements are not dispositive for the selection. The communication context requirements may comprise the last modality used in communication between originator and recipient. The static requirements may comprise the only modality the recipient can use for message reception. The communication service provider requirements may comprise a requirement based on message transmission cost.

To convert the received message to the selected modality, the example controller 302 may be configured (e.g., via the conversion module 306) to, when the received communication is an analog voice communication and the selected modality is digital data transmission, cause the analog voice communication to be converted to a digital data transmission using voice recognition software, determine whether voice recognition confidence is sufficient for the criticality of conveyed information, cause the digital data transmission to be transmitted to the message recipient when the voice recognition confidence is sufficient for the criticality of conveyed information, and notify the message originator when the voice recognition confidence is not sufficient.

To convert the received message to the selected modality the example controller 302 may be configured (e.g., via the conversion module 306) to, when the received communication is an analog voice communication and the selected modality is digital voice transmission, cause the analog voice communication to be converted to a digital voice transmission using voice recognition software, determine whether voice recognition confidence is sufficient for the criticality of conveyed information, cause the digital voice transmission to be transmitted to the message recipient when the voice recognition confidence is sufficient for the criticality of conveyed information, and notify the message originator when the voice recognition confidence is not sufficient.

To convert the received message to the selected modality, the example controller 302 may be configured (e.g., via the conversion module 306) to, when the received communication is digital text and the selected modality is digital data transmission, cause the digital text to be converted to a digital data transmission and cause the digital data transmission to be transmitted to the message recipient.

To convert the received message to the selected modality, the example controller 302 may be configured (e.g., via the conversion module 306) to, when the received communication is digital text and the selected modality is digital voice transmission, cause the digital text to be converted to a digital voice transmission and cause the digital voice transmission to be transmitted to the message recipient.

To convert the received message to the selected modality, the example controller 302 may be configured (e.g., via the conversion module 306) to, when the received communication is a digital data transmission and the selected modality is digital text, cause the digital data transmission to be converted to digital text and cause the digital text to be transmitted to the message recipient.

To convert the received message to the selected modality, the example controller 302 may be configured (e.g., via the conversion module 306) to, when the received communication is a digital data transmission and the selected modality is an analog voice communication, cause the digital data transmission to be converted to an analog voice communication and cause the analog voice communication to be transmitted to the message recipient.

To convert the received message to the selected modality, the example controller 302 may be configured (e.g., via the conversion module 306) to, when the received communication is a digital voice transmission and the selected modality is digital text, cause the digital voice transmission to be converted to digital text and cause the digital text to be transmitted to the message recipient.

To convert the received message to the selected modality the example controller 302 may be configured (e.g., via the conversion module 306) to, when the received communication is a digital voice transmission and the selected modality is an analog voice communication, cause the digital voice transmission to be converted to an analog voice communication and cause the analog voice communication to be transmitted to the message recipient.

The transmission modality selection may depend on a number of factors. The transmission modality selection may depend on the availability of the modality at the destination. For example, if only analog voice is implemented at destination, only analog voice can be used as the transmission modality. For example, if datalink is implemented but there is a system component failure in the datalink chain of equipment, then datalink may not be used as the transmission modality. In another example, if datalink is implemented only for some messages, then datalink may not be used as the transmission modality for messages that do not meet the requirement for datalink transmission.

The transmission modality selection may depend on the cost of communication. For example, a contracted service vendor may prefer that data transmission be used instead of voice transmission because data transmissions may be more cost efficient than digitalized voice.

The transmission modality selection may depend on the system configuration at the destination: By design, voice might be considered for some messages (e.g., short obvious messages); and data might be required for messages concerning complex objects (e.g., provision of GPS coordinates).

The transmission modality selection may depend on user preference at the destination. For example, the message recipient may choose voice or data depending of the messages. In another example, if a message recipient first communicated by voice to the message originator, the transmission modality selection may be by voice for the reply communication from the message originator to the message recipient.

Transmission modality selection could be synchronized between the unified communication system operated by the message originator and a system operated by the message recipient. This could be accomplished by the exchange of supervision messages between both systems to communicate recipient preferences.

Figure 4:
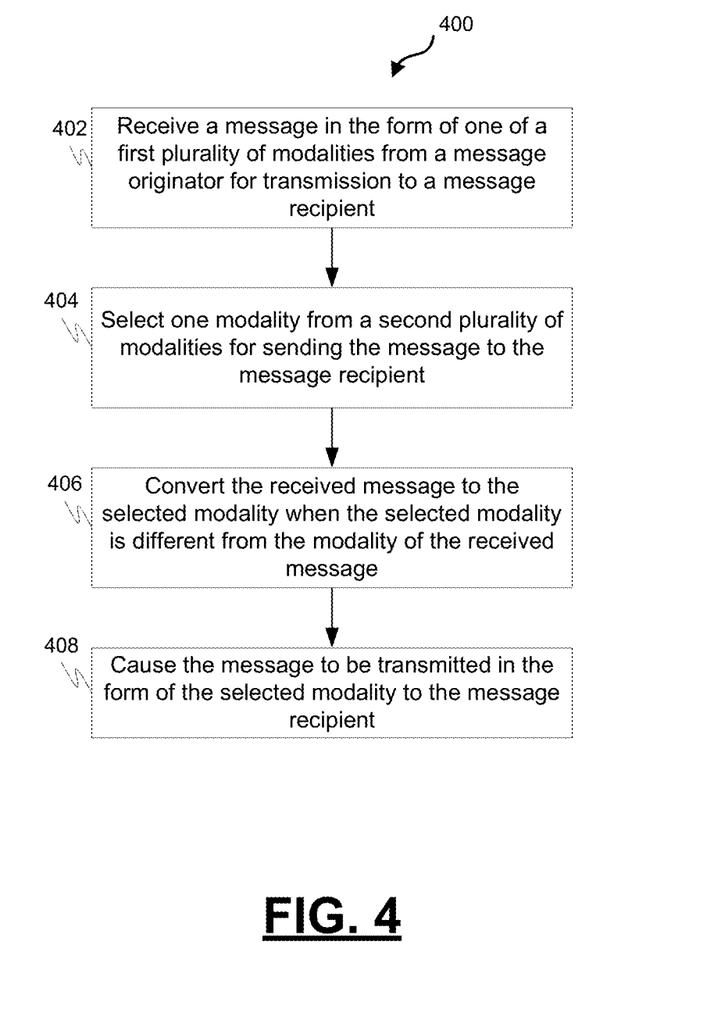
FIG. 4 is a process flow chart depicting an example process 400 for automatically choosing a communication modality from a plurality of communication modalities for use for communication between distant communication entities, in accordance with some embodiments.

When multiple communications exist between the message originator and a particular message recipient, the unified communication system 300 may be configured to link those messages even when the multiple communications are sent using different modalities. The unified communication system 300 may be configured to determine if a voice message overrides a data message, showing clearly the obsolete status of a message to the receiving user. The unified communication system 300 may also be configured to determine if a data message overrides a voice message, showing clearly the obsolete status of the message to the receiving user FIG. 4 is a process flow chart depicting an example process 400 for automatically choosing a communication modality from a plurality of communication modalities for use for communication between distant communication entities. The order of operation within the process 400 is not limited to the sequential execution as illustrated in the figure, but may be performed in one or more varying orders as applicable and in accordance with the present disclosure.

The example process 400 includes receiving a message in the form of one of a first plurality of modalities from a message originator for transmission to a message recipient (operation 402). The example process 400 may be used by a vehicle operator or a central control system. The message originator may be one of a vehicle operator or a central control system and the message recipient may be the other of the vehicle operator or the central control system. Alternatively, both the message originator and the message operator may be a vehicle operator.

The example process 400 includes selecting at least one modality from a second plurality of modalities for sending the message to the message recipient (operation 404). The second plurality of modalities may include a plurality of digital data transmission, digital voice transmission, digital text message, an analog voice message, and others. The selecting may include: determining for the specific message recipient the existence of any predetermined vehicle context requirements, predetermined static requirements, predetermined communication service provider requirements, communication context requirements, message recipient preferences, and message originator preferences; and making the selection based on the existing predetermined vehicle context requirements, predetermined static requirements, predetermined communication service provider requirements, communication context requirements, message recipient preferences, and message originator preferences. The communication context requirements may include the last modality used in communication between originator and recipient. The static requirements may include the only modality the recipient can use for message reception (temporarily or permanently). The communication service provider requirements comprise a requirement based on message transmission cost.

Making the selection may comprise making a selection that satisfies the predetermined vehicle context requirements, the predetermined static requirements and/or the predetermined communication service provider requirements. Making the selection may comprise making a selection that satisfies communication context requirements, message recipient preference, and/or a message originator preference when the predetermined vehicle context requirements, the predetermined static requirements and predetermined communication service provider requirements are not dispositive for the selection.

The example process 400 includes converting the received message to the selected modality when the selected modality is different from the modality of the received message (operation 406) and causing the message to be transmitted in the form of the selected modality to the message recipient (operation 408).

Converting the received message to the selected modality when the selected modality is different from the modality of the received message may comprise: when the received communication is an analog voice communication and the selected modality is digital data transmission, causing the analog voice communication to be converted to a digital data transmission using voice recognition software, determining whether voice recognition confidence is sufficient for the criticality of conveyed information, causing the digital data transmission to be transmitted to the message recipient when the voice recognition confidence is sufficient for the criticality of conveyed information, and notifying the message originator when the voice recognition confidence is not sufficient.

Converting the received message to the selected modality when the selected modality is different from the modality of the received message may comprise: when the received communication is an analog voice communication and the selected modality is digital voice transmission, causing the analog voice communication to be converted to a digital voice transmission using voice recognition software, determining whether voice recognition confidence is sufficient for the criticality of conveyed information, causing the digital voice transmission to be transmitted to the message recipient when the voice recognition confidence is sufficient for the criticality of conveyed information, and notifying the message originator when the voice recognition confidence is not sufficient.

Converting the received message to the selected modality when the selected modality is different from the modality of the received message may comprise: when the received communication is digital text and the selected modality is digital data transmission, causing the digital text to be converted to a digital data transmission and causing the digital data transmission to be transmitted to the message recipient.

Converting the received message to the selected modality when the selected modality is different from the modality of the received message may comprise: when the received communication is digital text and the selected modality is digital voice transmission, causing the digital text to be converted to a digital voice transmission and causing the digital voice transmission to be transmitted to the message recipient.

Converting the received message to the selected modality when the selected modality is different from the modality of the received message may comprise: when the received communication is a digital data transmission and the selected modality is digital text, causing the digital data transmission to be converted to digital text and causing the digital text to be transmitted to the message recipient.

Converting the received message to the selected modality when the selected modality is different from the modality of the received message may comprise: when the received communication is a digital data transmission and the selected modality is an analog voice communication, causing the digital data transmission to be converted to an analog voice communication and causing the analog voice communication to be transmitted to the message recipient.

Converting the received message to the selected modality when the selected modality is different from the modality of the received message may comprise: when the received communication is a digital voice transmission and the selected modality is digital text, causing the digital voice transmission to be converted to digital text and causing the digital text to be transmitted to the message recipient.

Converting the received message to the selected modality when the selected modality is different from the modality of the received message may comprise: when the received communication is a digital voice transmission and the selected modality is an analog voice communication, causing the digital voice transmission to be converted to an analog voice communication and causing the analog voice communication to be transmitted to the message recipient.

Described herein are apparatus, systems, techniques and articles for automatically choosing a communication modality from a plurality of communication modalities for use for communication between distant communication entities. The apparatus, systems, techniques and articles provided herein can reduce the workload associated with driver (e.g., pilot) /controller communication. The apparatus, systems, techniques and articles provided herein can reduce the workload by allowing the communication users to choose at any time the best communication modality. The apparatus, systems, techniques and articles provided herein can reduce the workload by reducing analyzing time thanks to a unified representation of incoming voice and data messages in a consistent way. The apparatus, systems, techniques and articles provided herein can reduce the workload by enabling a more systematic automation of actions driven by messages. The apparatus, systems, techniques and articles provided herein can increase safety by avoiding confusion in communication. The apparatus, systems, techniques and articles provided herein can decrease operation costs by allowing the vehicle owner (and airline operating center) to optimize communication costs by selecting the most cost efficient mode of communication at a given time. The apparatus, systems, techniques and articles provided herein can decrease vehicle costs by allowing use of fully digital solutions for both data and voice (potential applicability to airborne mobility).

In one embodiment, a communication system for automatically choosing a communication modality from a plurality of communication modalities for use for communication between distant communication entities is provided. The communication system comprising a controller configured to receive a message in the form of one of a first plurality of modalities from a message originator for transmission to a message recipient. The controller is further configured to select at least one modality from a second plurality of modalities for sending the message to the message recipient, wherein the second plurality of modalities includes a digital data transmission, a digital voice transmission, a digital text message and an analog voice message, and wherein to select the controller is further configured to: determine for the specific message recipient the existence of any predetermined vehicle context requirements, predetermined static requirements, predetermined communication service provider requirements, communication context requirements, message recipient preferences, and message originator preferences; and make the selection based on the existing predetermined vehicle context requirements, predetermined static requirements, predetermined communication service provider requirements, communication context requirements, message recipient preferences, and message originator preferences. The controller is further configured to convert the received message to the selected modality when the selected modality is different from the modality of the received message and transmit the message in the form of the selected modality to the message recipient.

These aspects and other embodiments may include one or more of the following features. The message originator may be one of a vehicle operator or a central control system and the message recipient may be the other of the vehicle operator or the central control system. The controller may be configured to receive the communication from the message originator in the form of analog voice, digital text, digital voice transmission, and a digital data transmission. To make the selection, the controller may be configured to make a selection that satisfies the predetermined vehicle context requirements, the predetermined static requirements and/or the predetermined communication service provider requirements. To make the selection, the controller may be configured to make the selection that satisfies communication context requirements, message recipient preference, and/or a message originator preference when the predetermined vehicle context requirements, the predetermined static requirements and predetermined communication service provider requirements are not dispositive for the selection. The communication context requirements comprise the last modality used in communication between originator and recipient. The static requirements may comprise the only modality the recipient can use for message reception. The communication service provider requirements may comprise a requirement based on message transmission cost. To convert the received message to the selected modality, the controller may be configured to, when the received communication is an analog voice communication and the selected modality is digital data transmission, cause the analog voice communication to be converted to a digital data transmission using voice recognition software, determine whether voice recognition confidence is sufficient for the criticality of conveyed information, cause the digital data transmission to be transmitted to the message recipient when the voice recognition confidence is sufficient for the criticality of conveyed information, and notify the message originator when the voice recognition confidence is not sufficient. To convert the received message to the selected modality, the controller may be configured to, when the received communication is an analog voice communication and the selected modality is digital voice transmission, cause the analog voice communication to be converted to a digital voice transmission using voice recognition software, determine whether voice recognition confidence is sufficient for the criticality of conveyed information, cause the digital voice transmission to be transmitted to the message recipient when the voice recognition confidence is sufficient for the criticality of conveyed information, and notify the message originator when the voice recognition confidence is not sufficient. To convert the received message to the selected modality, the controller may be configured to, when the received communication is digital text and the selected modality is digital data transmission, cause the digital text to be converted to a digital data transmission and cause the digital data transmission to be transmitted to the message recipient. To convert the received message to the selected modality, the controller may be configured to, when the received communication is digital text and the selected modality is digital voice transmission, cause the digital text to be converted to a digital voice transmission and cause the digital voice transmission to be transmitted to the message recipient. To convert the received message to the selected modality, the controller may be configured to, when the received communication is a digital data transmission and the selected modality is digital text, cause the digital data transmission to be converted to digital text and cause the digital text to be transmitted to the message recipient. To convert the received message to the selected modality, the controller may be configured to, when the received communication is a digital data transmission and the selected modality is an analog voice communication, cause the digital data transmission to be converted to an analog voice communication and cause the analog voice communication to be transmitted to the message recipient. To convert the received message to the selected modality, the controller may be configured to, when the received communication is a digital voice transmission and the selected modality is digital text, cause the digital voice transmission to be converted to digital text and cause the digital text to be transmitted to the message recipient. When the received communication is a digital voice transmission and the selected modality is an analog voice communication, to convert the received message to the selected modality, the controller may be configured to cause the digital voice transmission to be converted to an analog voice communication and cause the analog voice communication to be transmitted to the message recipient.

In another embodiment, a processor-implemented method for automatically choosing a communication modality from a plurality of communication modalities for use for communication between distant communication entities is provided. The method comprises: receiving a message in the form of one of a first plurality of modalities from a message originator for transmission to a message recipient. The method further comprises selecting at least one modality from a second plurality of modalities for sending the message to the message recipient, wherein the second plurality of modalities includes a digital data transmission, a digital voice transmission, a digital text message and an analog voice message, and wherein the selecting comprises: determining for the specific message recipient the existence of any predetermined vehicle context requirements, predetermined static requirements, predetermined communication service provider requirements, communication context requirements, message recipient preferences, and message originator preferences; and making the selection based on the existing predetermined vehicle context requirements, predetermined static requirements, predetermined communication service provider requirements, communication context requirements, message recipient preferences, and message originator preferences. The method further comprises converting the received message to the selected modality when the selected modality is different from the modality of the received message; and transmitting the message in the form of the selected modality to the message recipient.

These aspects and other embodiments may include one or more of the following features. The message originator may be one of a vehicle operator or a central control system and the message recipient may be the other of the vehicle operator or the central control system. Making the selection may comprise making a selection that satisfies the predetermined vehicle context requirements, the predetermined static requirements and/or the predetermined communication service provider requirements. Making the selection may comprise making a selection that satisfies communication context requirements, message recipient preference, and/or a message originator preference when the predetermined vehicle context requirements, the predetermined static requirements and predetermined communication service provider requirements are not dispositive for the selection. Converting the received message to the selected modality when the selected modality is different from the modality of the received message may comprise: when the received communication is an analog voice communication and the selected modality is digital data transmission, causing the analog voice communication to be converted to a digital data transmission using voice recognition software, determining whether voice recognition confidence is sufficient for the criticality of conveyed information, causing the digital data transmission to be transmitted to the message recipient when the voice recognition confidence is sufficient for the criticality of conveyed information, and notifying the message originator when the voice recognition confidence is not sufficient; when the received communication is an analog voice communication and the selected modality is digital voice transmission, causing the analog voice communication to be converted to a digital voice transmission using voice recognition software, determining whether voice recognition confidence is sufficient for the criticality of conveyed information, causing the digital voice transmission to be transmitted to the message recipient when the voice recognition confidence is sufficient for the criticality of conveyed information, and notifying the message originator when the voice recognition confidence is not sufficient; when the received communication is digital text and the selected modality is digital data transmission, causing the digital text to be converted to a digital data transmission and causing the digital data transmission to be transmitted to the message recipient; when the received communication is digital text and the selected modality is digital voice transmission, causing the digital text to be converted to a digital voice transmission and causing the digital voice transmission to be transmitted to the message recipient; when the received communication is a digital data transmission and the selected modality is digital text, causing the digital data transmission to be converted to digital text and causing the digital text to be transmitted to the message recipient; when the received communication is a digital data transmission and the selected modality is an analog voice communication, causing the digital data transmission to be converted to an analog voice communication and causing the analog voice communication to be transmitted to the message recipient; when the received communication is a digital voice transmission and the selected modality is digital text, causing the digital voice transmission to be converted to digital text and causing the digital text to be transmitted to the message recipient; and/or when the received communication is a digital voice transmission and the selected modality is an analog voice communication, causing the digital voice transmission to be converted to an analog voice communication and causing the analog voice communication to be transmitted to the message recipient.

In another embodiment, non-transitory computer readable media encoded with programming instructions configurable to cause a processor to perform a method is provided. The method comprises: receiving a message in the form of one of a first plurality of modalities from a message originator for transmission to a message recipient. The method further comprises selecting at least one modality from a second plurality of modalities for sending the message to the message recipient, wherein the second plurality of modalities includes a digital data transmission, a digital voice transmission, a digital text message and an analog voice message, and wherein the selecting comprises: determining for the specific message recipient the existence of any predetermined vehicle context requirements, predetermined static requirements, predetermined communication service provider requirements, communication context requirements, message recipient preferences, and message originator preferences; and making the selection based on the existing predetermined vehicle context requirements, predetermined static requirements, predetermined communication service provider requirements, communication context requirements, message recipient preferences, and message originator preferences. The method further comprises converting the received message to the selected modality when the selected modality is different from the modality of the received message; and transmitting the message in the form of the selected modality to the message recipient.

These aspects and other embodiments may include one or more of the following features. The message originator may be one of a vehicle operator or a central control system and the message recipient may be the other of the vehicle operator or the central control system. Making the selection may comprise making a selection that satisfies the predetermined vehicle context requirements, the predetermined static requirements and/or the predetermined communication service provider requirements. Making the selection may comprise making a selection that satisfies communication context requirements, message recipient preference, and/or a message originator preference when the predetermined vehicle context requirements, the predetermined static requirements and predetermined communication service provider requirements are not dispositive for the selection. Converting the received message to the selected modality when the selected modality is different from the modality of the received message may comprise: when the received communication is an analog voice communication and the selected modality is digital data transmission, causing the analog voice communication to be converted to a digital data transmission using voice recognition software, determining whether voice recognition confidence is sufficient for the criticality of conveyed information, causing the digital data transmission to be transmitted to the message recipient when the voice recognition confidence is sufficient for the criticality of conveyed information, and notifying the message originator when the voice recognition confidence is not sufficient; when the received communication is an analog voice communication and the selected modality is digital voice transmission, causing the analog voice communication to be converted to a digital voice transmission using voice recognition software, determining whether voice recognition confidence is sufficient for the criticality of conveyed information, causing the digital voice transmission to be transmitted to the message recipient when the voice recognition confidence is sufficient for the criticality of conveyed information, and notifying the message originator when the voice recognition confidence is not sufficient; when the received communication is digital text and the selected modality is digital data transmission, causing the digital text to be converted to a digital data transmission and causing the digital data transmission to be transmitted to the message recipient; when the received communication is digital text and the selected modality is digital voice transmission, causing the digital text to be converted to a digital voice transmission and causing the digital voice transmission to be transmitted to the message recipient; when the received communication is a digital data transmission and the selected modality is digital text, causing the digital data transmission to be converted to digital text and causing the digital text to be transmitted to the message recipient; when the received communication is a digital data transmission and the selected modality is an analog voice communication, causing the digital data transmission to be converted to an analog voice communication and causing the analog voice communication to be transmitted to the message recipient; when the received communication is a digital voice transmission and the selected modality is digital text, causing the digital voice transmission to be converted to digital text and causing the digital text to be transmitted to the message recipient; and/or when the received communication is a digital voice transmission and the selected modality is an analog voice communication, causing the digital voice transmission to be converted to an analog voice communication and causing the analog voice communication to be transmitted to the message recipient.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A communication system in an aircraft for reducing flight crew workload for communication between a flight crew member and a flight operating center (FOC), the communication system comprising a controller configured to:
   receive a flight crew generated analog voice message for transmission to a first FOC;
   receive a flight crew generated data message for transmission to a second FOC;
   determine a last modality used in communication between the flight crew member and the first FOC, a last modality used in communication between the flight crew member and the second FOC, a flight crew member preference, and an existence of a non-normal aircraft state, wherein the last modality is a modality from a set of modalities used in a most recent communication between the flight crew member and the first FOC or the second FOC, and wherein the set of modalities includes a digital data transmission, a digital voice transmission, a digital text message and an analog voice message;

select, based on the existence of the non-normal aircraft state, the last modality used in communication between the flight crew member and the first FOC or the last modality used in communication between the flight crew member and the second FOC, and the flight crew member preference, a first modality from the set of modalities for sending the flight crew member generated analog voice message to the first FOC or a second modality from the set of modalities for sending the flight crew member generated data message to the second FOC;

convert the flight crew member generated analog voice message to a digital voice message when the first modality is a digital voice transmission;

convert the flight crew member generated analog voice message to a data message when the first modality is a digital data transmission or a digital text message;

convert the flight crew member generated data message to the second modality when the second modality is different from the modality of the flight crew member generated data message;

cause the flight crew member generated analog voice message to be transmitted in a form of the first modality to the first FOC; and cause the flight crew member generated data message to be transmitted in a form of the second modality to the second FOC.

2. The system of claim 1, wherein the data message comprises one of a digital text message or a digital data transmission.

3. The system of claim 1, wherein to select, the controller is further configured to select based on a predetermined static requirement or a predetermined communication service provider requirement.

4. The system of claim 3, wherein to select, the controller is further configured to select based on a communication context requirement or an FOC preference.

5. The system of claim 3, wherein the static requirement comprises a single modality the FOC can use for message reception.

6. The system of claim 1, wherein when the flight crew member generated analog message comprises an analog voice communication and the selected modality is digital data transmission, the controller is configured to cause the analog voice communication to be converted to a digital data transmission using voice recognition software, determine whether a voice recognition confidence is sufficient for conveyed information, cause the digital data transmission to be transmitted when the voice recognition confidence is sufficient for the conveyed information, and notify the flight crew member when the voice recognition confidence is not sufficient.

7. The system of claim 1, wherein when the flight crew member generated analog message comprises an analog voice communication and the selected modality is digital voice transmission, the controller is configured to cause the analog voice communication to be converted to a digital voice transmission using voice recognition software, determine whether voice recognition confidence is sufficient for conveyed information, cause the digital voice transmission to be transmitted when the voice recognition confidence is sufficient for the conveyed information, and notify the flight crew member when the voice recognition confidence is not sufficient.

8. The system of claim 1, wherein when the flight crew member generated data message comprises digital text and the selected modality is digital data transmission, the controller is configured to cause the digital text to be converted to a digital data transmission and cause the digital data transmission to be transmitted.

9. The system of claim 1, wherein when the flight crew member generated data message comprises digital text and the selected modality is digital voice transmission, the controller is configured to cause the digital text to be converted to a digital voice transmission and cause the digital voice transmission to be transmitted.

10. The system of claim 1, wherein when the flight crew member generated data message comprises a digital data transmission and the selected modality is digital text, the controller is configured to cause the digital data transmission to be converted to digital text and cause the digital text to be transmitted.

11. The system of claim 1, wherein when the flight crew member generated data message comprises a digital data transmission and the selected modality is an analog voice communication, the controller is configured to cause the digital data transmission to be converted to an analog voice communication and cause the analog voice communication to be transmitted.

12. The system of claim 1, wherein when the flight crew member generated analog voice message comprises a digital voice transmission and the selected modality is digital text, the controller is configured to cause the digital voice transmission to be converted to digital text and cause the digital text to be transmitted.

13. The system of claim 1, wherein, when the flight crew member generated analog voice message comprises a digital voice transmission and the selected modality is an analog voice communication, the controller is configured to cause the digital voice transmission to be converted to an analog voice communication and cause the analog voice communication to be transmitted.

14. A processor-implemented method in an aircraft for reducing flight crew workload for communication between a flight crew member and a flight operating center (FOC), the method comprising:

receiving a flight crew generated analog voice message for transmission to a first FOC and a flight crew generated data message for transmission to a second FOC;

determining a last modality used in communication between the flight crew member and the first FOC, a last modality used in communication between the flight crew member and the second FOC, a flight crew member preference, and an existence of a non-normal aircraft state, wherein the last modality is a modality from a set of modalities used in a most recent communication between the flight crew member and the first FOC or the second FOC, and wherein the set of modalities includes a digital data transmission, a digital voice transmission, a digital text message and an analog voice message;

selecting, based on the existence of the non-normal aircraft state, the last modality used in communication between the flight crew member and the first FOC, the last modality used in communication between the flight crew member and the second FOC, and the flight crew member preference, a first modality from the set of modalities for sending the flight crew member generated analog voice message to the first FOC and a second modality from the set of modalities for sending the flight crew member generated data message to the second FOC;

converting the flight crew member generated analog voice message to a digital voice message when the first modality is a digital voice transmission;

converting the flight crew member generated analog voice message to a data message when the first modality is a digital data transmission or a digital text message;

converting the flight crew member generated data message to the second modality when the second modality is different from the modality of the flight crew member generated data message;

causing the flight crew member generated analog voice message to be transmitted in a form of the first modality to the first FOC; and causing the flight crew member generated data message to be transmitted in a form of the second modality to the second FOC.

15. The method of claim 14, wherein the selecting further comprises selecting based on a predetermined static requirement or a predetermined communication service provider requirement.

16. The method of claim 14, wherein the selecting further comprises selecting based on a communication context requirement or an FOC preference.

17. The method of claim 14, further comprising:

when the flight crew generated analog voice message comprises an analog voice communication and the selected modality is digital data transmission, causing the analog voice communication to be converted to a digital data transmission using voice recognition software, determining whether voice recognition confidence is sufficient for the criticality of conveyed information, causing the digital data transmission to be transmitted when the voice recognition confidence is sufficient for the criticality of conveyed information, and notifying the flight crew member when the voice recognition confidence is not sufficient;

when the flight crew generated analog voice message comprises an analog voice communication and the selected modality is digital voice transmission, causing the analog voice communication to be converted to a digital voice transmission using voice recognition software, determining whether voice recognition confidence is sufficient for the criticality of conveyed information, causing the digital voice transmission to be transmitted when the voice recognition confidence is sufficient for the criticality of conveyed information, and notifying the flight crew member when the voice recognition confidence is not sufficient;

when the flight crew generated data message comprises digital text and the selected modality is digital data transmission, causing the digital text to be converted to a digital data transmission and causing the digital data transmission to be transmitted;

when the flight crew generated data message comprises digital text and the selected modality is digital voice transmission, causing the digital text to be converted to a digital voice transmission and causing the digital voice transmission to be transmitted;

when the flight crew generated data message comprises a digital data transmission and the selected modality is digital text, causing the digital data transmission to be converted to digital text and causing the digital text to be transmitted;

when the flight crew generated data message comprises a digital data transmission and the selected modality is an analog voice communication, causing the digital data transmission to be converted to an analog voice communication and causing the analog voice communication to be transmitted;

when the flight crew generated analog voice message comprises a digital voice transmission and the selected modality is digital text, causing the digital voice transmission to be converted to digital text and causing the digital text to be transmitted; or when the flight crew generated analog voice message comprises a digital voice transmission and the selected modality is an analog voice communication, causing the digital voice transmission to be converted to an analog voice communication and causing the analog voice communication to be transmitted.

18. Non-transitory computer readable media encoded with programming instructions configurable to cause a controller in an aircraft to:

receive a flight crew generated analog voice message for transmission to a first flight operating center (FOC);

receive a flight crew generated data message for transmission to a second FOC;

determine a last modality used in communication between the flight crew member and the first FOC, a last modality used in communication between the flight crew member and the second FOC, a flight crew member preference, and an existence of a non-normal aircraft state, wherein the last modality is a modality from a set of modalities used in a most recent communication between the flight crew member and the first FOC or the second FOC, and wherein the set of modalities includes a digital data transmission, a digital voice transmission, a digital text message and an analog voice message;

select, based on the existence of the non-normal aircraft state, the last modality used in communication between the flight crew member and the first FOC or the last modality used in communication between the flight crew member and the second FOC, and the flight crew member preference, a first modality from the set of modalities for sending the flight crew member generated analog voice message to the first FOC or a second modality from the set of modalities for sending the flight crew member generated data message to the second FOC;

convert the flight crew member generated analog voice message to a digital voice message when the first modality is a digital voice transmission;

convert the flight crew member generated analog voice message to a data message when the first modality is a digital data transmission or a digital text message;

convert the flight crew member generated data message to the second modality when the second modality is different from the modality of the flight crew member generated data message;

cause the flight crew member generated analog voice message to be transmitted in a form of the first modality to the first FOC; and cause the flight crew member generated data message to be transmitted in a form of the second modality to the second FOC.

19. The non-transitory computer readable media of claim 18, wherein:

when the flight crew generated analog voice message comprises an analog voice communication and the selected modality is digital data transmission, the programming instructions configure the controller to cause the analog voice communication to be converted to a digital data transmission using voice recognition software, determining whether voice recognition confidence is sufficient for the criticality of conveyed information, causing the digital data transmission to be transmitted when the voice recognition confidence is sufficient for the criticality of conveyed information, and notifying the flight crew member when the voice recognition confidence is not sufficient;

when the flight crew generated analog voice message comprises an analog voice communication and the selected modality is digital voice transmission, the programming instructions configure the controller to: cause the analog voice communication to be converted to a digital voice transmission using voice recognition software, determine whether voice recognition confidence is sufficient for the criticality of conveyed information, cause the digital voice transmission to be transmitted when the voice recognition confidence is sufficient for the criticality of conveyed information, and notify the flight crew member when the voice recognition confidence is not sufficient;

when the flight crew generated data message comprises digital text and the selected modality is digital data transmission, the programming instructions configure the controller to cause the digital text to be converted to a digital data transmission and cause the digital data transmission to be transmitted;

when the flight crew generated data message comprises digital text and the selected modality is digital voice transmission, the programming instructions configure the controller to cause the digital text to be converted to a digital voice transmission and cause the digital voice transmission to be transmitted;

when the flight crew generated data message comprises a digital data transmission and the selected modality is digital text, the programming instructions configure the controller to cause the digital data transmission to be converted to digital text and cause the digital text to be transmitted;

when the flight crew generated data message comprises a digital data transmission and the selected modality is an analog voice communication, the programming instructions configure the controller to cause the digital data transmission to be converted to an analog voice communication and cause the analog voice communication to be transmitted;

when the flight crew generated analog voice message comprises a digital voice transmission and the selected modality is digital text, the programming instructions configure the controller to cause the digital voice transmission to be converted to digital text and cause the digital text to be transmitted; and when the flight crew generated analog voice message comprises a digital voice transmission and the selected modality is an analog voice communication, the programming instructions configure the controller to cause the digital voice transmission to be converted to a n analog voice communication and cause the analog voice communication to be transmitted.

20. The communication system of claim 1, wherein the FOC comprises an air traffic control (ATC) center.

* * * * *